March 19, 1963 J. E. SMITH, JR 3,082,411
BEARING MOUNTING STRUCTURE FOR MAGNETIC
MEMORY DRUM APPARATUS
Filed April 28, 1961 2 Sheets-Sheet 1

INVENTOR.
JOSEPH E. SMITH JR.
BY
Bower & Patalidis
ATTORNEYS

BEARING MOUNTING STRUCTURE FOR MAGNETIC MEMORY DRUM APPARATUS

Filed April 28, 1961 2 Sheets-Sheet 2

INVENTOR.
JOSEPH E. SMITH JR.
BY
Bower & Patalidis
ATTORNEYS 3,082,411

BEARING MOUNTING STRUCTURE FOR MAGNETIC MEMORY DRUM APPARATUS

Joseph E. Smith, Jr., Birmingham, Mich., assignor to Ex-Cell-O Corporation, Detroit, Mich.

Filed Apr. 28, 1961, Ser. No. 106,217
10 Claims. (Cl. 340—174.1)

This invention relates to magnetic memory drum apparatus and, more particularly, to a bearing mounting structure for magnetic memory drum apparatus.

In the computer art, in the data processing art, and the like, magnetic memory drums are in extensive use, as is well known to those skilled in the art. Such a drum consists generally of a non-magnetic cylindrical body having a surface coating of magnetizable material rotating at high speed within a housing, under one or more rows of magnetic transducer heads. The transducer heads serve the purpose of recording, erasing and reading informations stored on the surface of the drum in the form of magnetic pulses.

The gap spacing between the magnetic head pole pieces and the magnetizable surface on the drum is critical and is difficult to maintain, specially in applications where wide differences of temperatures are encountered. The thermal expansion of the drum and the thermal expansion of the structure supporting the magnetic heads must substantially be of the same order to assure a correct and constant gap spacing, or means must be provided to compensate for inequal thermal expansions. The problem is complicated by the fact that the materials used for the component parts of the apparatus are dissimilar and have consequently dissimilar coefficients of expansion. Furthermore, some parts are rotating at high speed and others are stationary, and the inequalities of expansions between the components exert forces upon the bearings of the rotary parts that may result in binding or looseness, unless compensated for by some means. An object of the present invention, therefore, is to provide a bearing mounting for a rotating precision member, such as magnetic drum memory apparatus, where axial elongation of the rotating member due to thermal expansion does not require a sliding or moving relationship between the bearing and the surface within which it is mounted.

Another object of the present invention is to provide a bearing mounting for a rotating member where differential or relative axial movement between the housing and the rotating member created by simultaneous differences in the thermal conditions in the respective members is compensated for by the flexure of the bearing mounting.

A further object of the invention is to provide a bearing mounting that cannot cause the bearing to become overloaded, to bind or become loose due to differences in expansion between the rotating member and the stationary supporting member. One more object of the invention is to provide a bearing mounting which can be stressed to create a predetermined axial preload on the bearing supported rotating member.

Still another object of the invention is to provide a bearing mounting which can be initially adjusted axially in such a way that the bearings are in line to line or metal to metal contact prior to exerting the initial axial preload, so as to compensate for axial dimensional differences from bearing to bearing and the related bearing seat to bearing seat dimensional differences, such variations being the normal manufacturing tolerances in respect to nominal dimensions.

Another object of the invention is to provide a bearing mounting for a precision rotating member which may be made of a metal having the same coefficient of thermal expansion as that of the bearing, thereby reducing the possibility of thermally created looseness or excessive stresses between the bearing and the bore in which it is mounted when subjected to servere thermal environmental extremes.

A further object of the invention is to provide a bearing mounting which is compliant to the radial dimensional changes of the housing of a magnetic drum memory apparatus.

Still another object of the invention is to provide a magnetic drum apparatus which has built-in features permitting safe shipping of the unit, without any dismantling of the components or complicated preparation for shipping and setting up in the field.

A further object of the invention is to provide a magnetic drum apparatus which permits a limited amount of in-the-field adjustment of the magnetic heads to drum surface spacing.

Still a further object of the invention is to provide a magnetic memory drum apparatus which is dependable, reliable, efficient and which may be constructed at a relatively low cost.

Other objects and advantages will become apparent to those skilled in the art after reference to the following detailed description read in conjunction with the accompanying drawings, which illustrate the principles of the invention and some of the best modes which have been contemplated of utilizing these principles:

In general, the invention consists of a stationary hollow housing supporting a plurality of magnetic transducer heads having their pole pieces disposed toward the interior of the housing in close proximity to the magnetizable surface of a rotatable drum member. In one application of the invention, the housing is substantially cylindrical and the drum is tapered. In another application, the housing is tapered and the drum is cylindrical. These two combinations permit the magnetic transducers to be mounted on the housing by means of the mounting bars illustrated which are the subject matter of the copending application of Joseph E. Smith, Jr., Serial No. 106,216 filed April 28, 1961, and assigned to the assignee of the present invention, and reference may be had thereto for a more detailed description of the method used for fastening the transducer heads and of the means for adjusting and setting the air gap between the transducer heads pole pieces and the magnetizable surface on the drum.

The drum is fastened to a shaft which is in turn journalled in bearings supported by resilient bellows-like diaphragm disks having undulations or corrugations, disposed regularly and concentrically around their center, and slots extending radially from proximately the center to and through the periphery of the disks. Means are provided for longitudinal axial adjustment of the bearings and for initial preloading of the bearings. In one modification, one of the bellows-like diaphragm disks is replaced by a flat and rigid disk plate.

Figure 1:
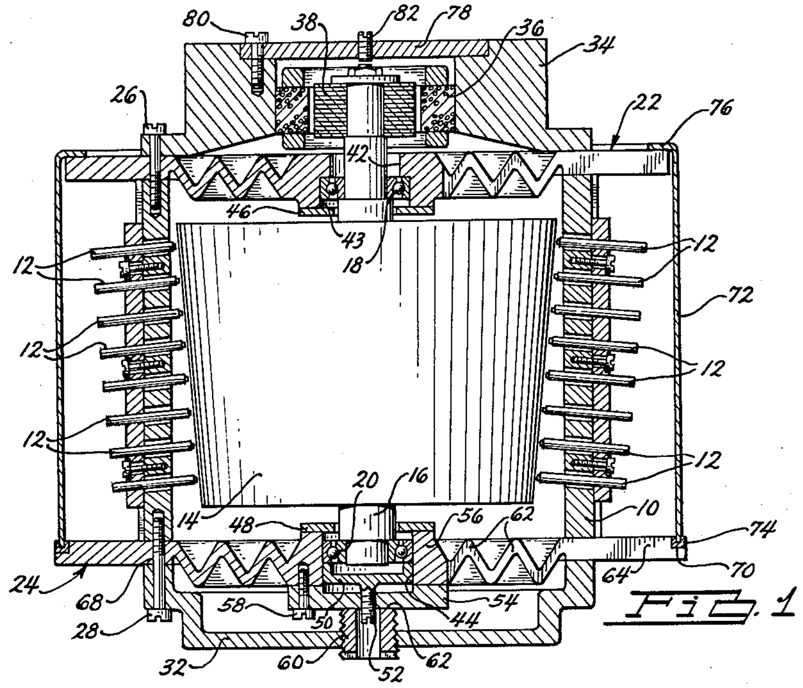
FIG. 1 is a sectional view of a magnetic drum and housing assembly in accordance with the present invention utilizing, by way of example, a tapered drum in combination with a cylindrical housing.

Referring now to FIG. 1, the magnetic memory drum apparatus comprises a cylindrical stationary housing 10 having a plurality of transducer heads 12 extending therethrough and fastened by any suitable means. For illustrative purpose, the transducer heads have been shown to be preferably mounted by means of the bar system disclosed in the copending application of Joseph E. Smith, Jr., Serial No. 106,216.

A drum 14 is contained within the housing 12 and is rigidly secured to a shaft 16. The shaft 16 is journalled at each end by means of the angular contact ball bearings 18 and 20 disposed in suitable bores 42 and 44 of the flexible diaphragm disks 22 and 24. Diaphragm disk 24 is mounted upon the bottom end of housing 10 by means of the screws or bolts 28 which are also used to fasten thereon the bottom end bell plate member 32. In a similar manner, the other diaphragm disk 22 is mounted upon the upper end of the housing by means of the screws or bolts 26 which are also used to fasten thereon the top end bell motor housing 34. Housing 34 supports the stator winding 36 of an electric motor having its rotor 38 affixed to shaft 16, in order to drive the drum 14 in the usual manner.

Both the diaphragm disks are constructed in a similar manner, the only difference being in their bores 42 and 44, situated respectively in disks 22 and 24 and adapted to receive the outer race rings of the ball bearings 18 and 20. Bore 42, in disk 22, has a step-like enlarged portion 43 in which is nested the outer race ring of bearing 18 and preventing any axial displacement of the said race ring in the direction toward the top of the shaft as illustrated. The end of bore 43 toward the inside of the housing is partly obturated by a washer 46, fastened by screws (not shown), for the purpose of both preventing the outer race ring of bearing 18 from escaping from bore 43 during assembly and acting as a slinger for bearing 18. The bore 44 of diaphragm disk 24 is smooth and is adapted to slidably receive the outer race ring of bearing 20. The end of bore 44 toward the inside of the housing is partly obturated by a washer 48 affording a passage in its center for shaft 16. Washer 48 has two purposes: it is an abutment preventing bearing 20 from escaping from bore 44 and it acts as a slinger for bearing 20. The other end of bore 44 slidably accepts a cup-like cartridge member 50, having an integral threaded member 52, along its axis thereon, protruding through a threaded opening in end cap 54. End cap 54 is fixedly fastened upon the central hub 56 of diaphragm 24 by means of the screws 58. A threaded hollow sleeve 60 having a face 62 normally abutting against end cap 54 is adjustably received in an axial threaded opening in end bell plate member 32.

Figure 2:
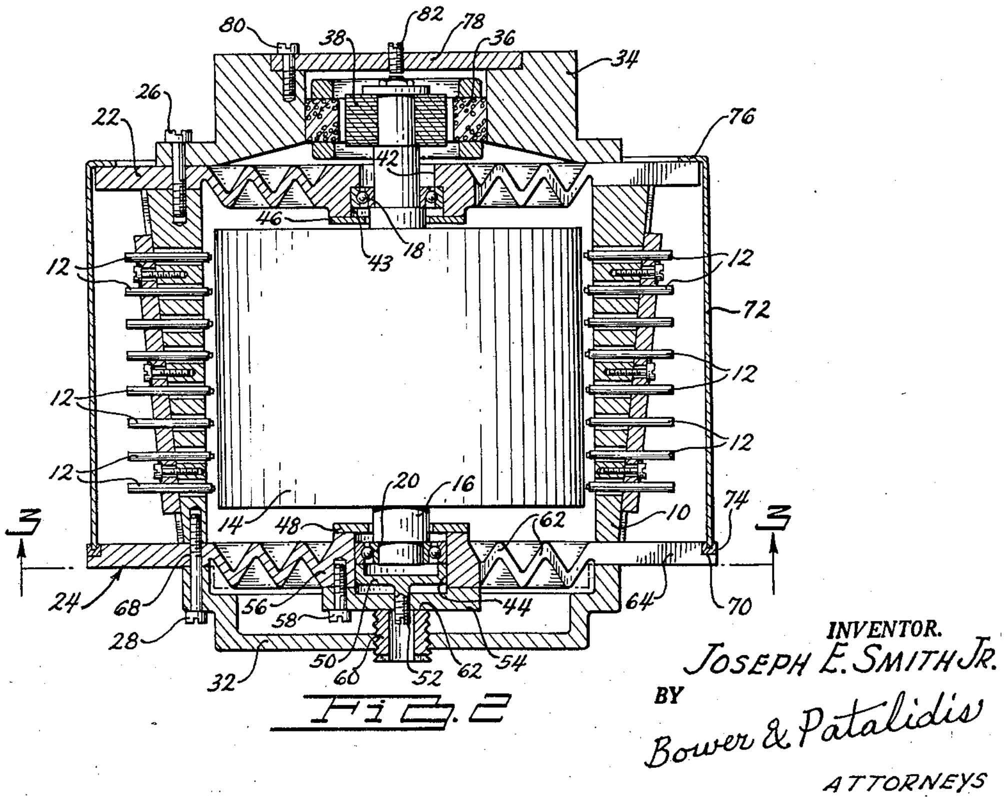
FIG. 2 is a view similar to FIG. 1, but showing, by way of example, a cylindrical drum in combination with a tapered housing.
Figure 3:
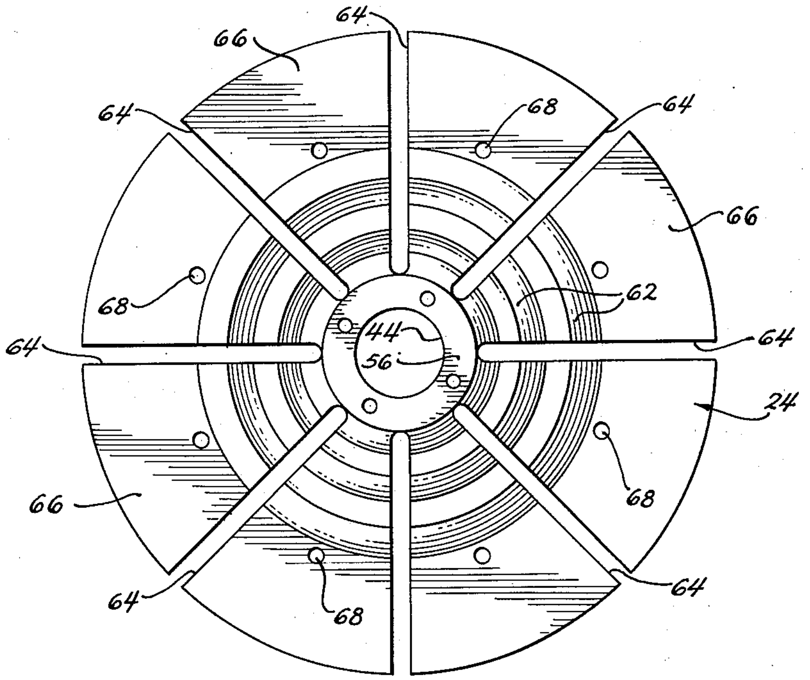
FIG. 3 is a plan view of a bearing mounting bellows or diaphragm in accordance with the present invention, taken from line 3—3 of FIG. 2.

The apparatus illustrated in FIG. 2 is similarly constructed with the exception of the drum 14 which is cylindrical and the housing 10 which is tapered. In both applications, the diaphragm disk 24 has a series of concentric undulations or corrugations 62 and a series of radial slots 64 extending substantially from the central rim 56 all the way through the periphery of the disk. Proximate the periphery, the disk has a flat even surface 66 provided with holes 68 for mounting upon the housing (FIG. 3). Along the edge of disk 24 runs a circular groove 70 for fastening thereon of a light shroud or enclosure 72 by means of a rubber channel or the like 74. The other end of shroud 72 is inwardly bent as shown at 76 and is fastened to the edge of disk 22 by means of metal screws (not shown).

In the examples of FIGS. 1 and 2, upper disk 22 is constituted in the same manner as bottom disk 24, and the number of undulations in both disks, the thickness and composition of the material, the number and width of the radial slots are the important factors that determine the diaphragm force in function of the deflection of the center rim in relation to the periphery. The radial slots extend through the peripheral edge of the disks in order to allow the rim to comply to thermally induced dimensional changes in the housing. An added advantage resulting from the presence of the radial slots is to afford a better ventilation of the interior of the apparatus.

The metal of disks 22—24 is preferably the same or is preferably chosen as having the same coefficient of linear expansion as the metal of the race rings of bearings 18—20, in order to avoid any thermally induced stress or undue looseness in the bearing mounting and bearing assemblies.

The end of motor housing 34 is closed by a plate 78 affixed thereon by means of the screws 80 and carrying a threaded member 82 aligned with the centerline of shaft 16 for the purpose to be explained hereinafter.

After assembly of the devices shown in FIGS. 1 and 2, the threaded member 52 is turned until there remains no longitudinal axial play in the bearings. Further rotation of threaded member 52 deflects axially the bellows diaphragms 22—24 and induces an axial force or preload on the bearings. Specific preloads can be established on the basic of known data relative to preload force in function of deflection of the bellows diaphragms. Dimensional differences further created by thermal variations in the structure will not create variations in preload beyond tolerable amounts with properly designed diaphragm disks and with a predetermined deflection of the bellows. Variations between the length of the shaft and the length of the housing are automatically compensated for because of the flexibility of the bellows diaphragms.

The hollow threaded member 60 is locked in a predetermined position with its end face 62 either in contact with the surface of end cap 54 or away from it in order to either prevent or limit excessive axial excrusion of the bearing supporting diaphragm center rim under severe shock or vibration.

During shipment of the unit, face 62 of hollow threaded member 60 is brought in contact with the surface of end cap 54 and upper threaded member 82 is tightened against the upper end of shaft 16 to prevent movement of the drum due to shock or vibration. When the unit is placed in operation, the threaded member 82 is backed off a small distance in order to free shaft 16.

Figure 4:
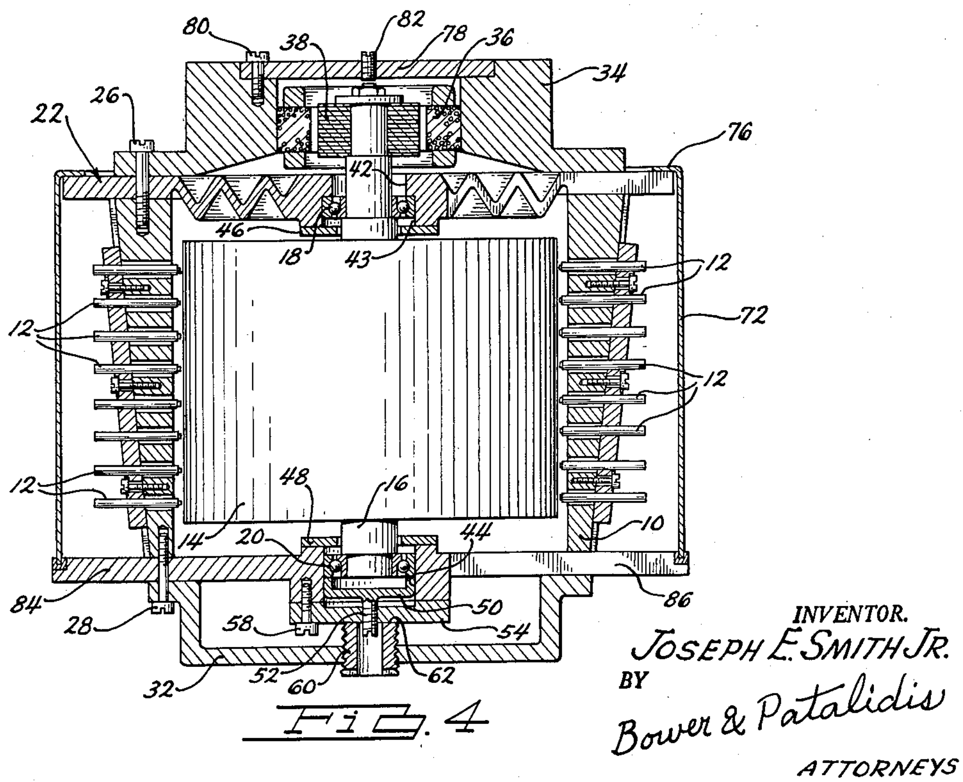
FIG. 4 is a sectional view similar to FIG. 1, but showing a modification of the invention.

In the example of FIG. 4, the bottom bellows diaphragm has been replaced by a substantially flat rigid disk plate 84, having radial slots 86. The rest of the device is the same as described previously, but only the top bellows diaphragm 22 is susceptible to be deflected. It is obvious that the positions of the bearing supports may be reversed, with the slotted disk plate at the top and the bellows diaphragm disk at the bottom.

In the example of FIG. 1, it is obvious that the hollow threaded member 60 can be used for limited axial movement of the drum which results in limited variation of the magnetic head pole pieces to drum surface spacing, because of the taper of the drum. The ability of such a limited adjustment in air gap spacing is a valuable adjunct to the possible adjustment obtained by usual means.

It is obvious that the foregoing detailed description has been given for the purpose of illustration of the principle of the invention, and it is manifest that many changes, omissions and modifications may be made therein without departing from the essential spirit and scope of the invention.

What is claimed is:

1. A magnetic memory drum apparatus comprising: a stationary housing; a rotatable drum structure with a magnetizable surface layer thereon; a plurality of magnetic transducer heads mounted upon the stationary housing with their pole pieces in close proximity to said magnetizable surface layer; a shaft affixed to the rotatable drum structure concentrically about the axis thereof; first and second bearing means supporting the shaft for rotation relatively to the stationary housing; first and second bellows-like diaphragm mounting disks fastened to the ends of the stationary housing and supporting the first and second bearing means concentrically the stationary housing; both of said mounting disks being longitudinally flexible by having concentric corrugation at regularly increasing radial distances from the center thereof and evenly spaced radial slots extending substantially from a thicker central hub portions to and through the edge portion of said mounting disks; said first mounting disk having its hub portion adapted to fixedly support the outer race ring of the first bearing means and said second mounting disk having its hub portion with a bore adapted to slidably accept the outer race ring of the second bearing means; and means slidably moving the outer race ring of the second bearing means for longitudinal adjustment thereof.

2. A magnetic memory drum apparatus as claimed in claim 1 wherein the means slidably moving the outer race ring of the second bearing means comprises a cup-like cartridge member adapted to slidably fit within the bore in the hub of the second mounting disk, said cartridge member having a threaded member integral with the end wall thereof and adapted to coact with a fixed end cap fastened to the outer end of said hub for longitudinal displacement of said outer race ring by rotation of said threaded member.

3. A magnetic memory drum apparatus as claimed in claim 2 further comprising an end bell member fastened to the end of the housing mounting the second mounting disk, and a hollow threaded member threadable through the center of said end bell member for adjustably limiting the amount of outwardly longitudinal deflection of the second mounting disk.

4. A magnetic memory drum apparatus as claimed in claim 3 further comprising a threaded member carried by a closure plate on the other end of the housing, said threaded member being along the axis of the shaft and being susceptible of coacting with the hollow threaded member for immobilizing said shaft during shipping of the apparatus.

5. A magnetic memory drum apparatus as claimed in claim 3 wherein only one mounting disk is a bellows-like flexible diaphragm disk and the other mounting disk is a substantially flat rigid disk.

6. A magnetic memory drum apparatus as claimed in claim 3 wherein the drum is cylindrical.

7. A magnetic memory drum apparatus as claimed in claim 3 wherein the drum is tapered and a limited adjustment of the air gap spacing between the transducer head pole pieces and the magnetizable surface of the drum is obtainable by rotation of the hollow threaded member resulting in differential longitudinal deflections of the first and second mounting disks.

8. A data storage apparatus comprising: a stationary housing structure; a plurality of magnetic heads mounted upon the stationary housing structure; a rotatable drum structure with a magnetizable layer upon the surface thereof; a shaft affixed to the rotatable drum structure concentrically about the axis thereof; first and second bearing means rotatably supporting the shaft; and first and second bearing support members permitting axial expansion and contraction of the shaft and radial expansion and contraction of the stationary housing structure, wherein each of said first and second bearing support members comprises a metal disk having a central integral hub with a bore for supporting the outer race ring of the bearing means, a plurality of radial slots extending from the hub through the peripheral rim of the disk, and wherein at least one of said bearing support members has a plurality of concentric undulations extending between the hub and a flat annular portion proximate the rim.

9. A magnetic memory drum apparatus as claimed in claim 8 further comprising means deflecting the bearing support members in opposite directions along the longitudinal axis to thereby preload the bearing means.

10. A magnetic memory drum apparatus as claimed in claim 9 further comprising means limiting the deflection of said bearing support members.

References Cited in the file of this patent

UNITED STATES PATENTS

| | | |
|---|---|---|
| 2,789,224 | Leonard | Apr. 16, 1957 |
| 2,885,583 | Zunick et al. | May 5, 1959 |